No. 646,320. Patented Mar. 27, 1900.
J. R. SELZER.
CARBURETER.
(Application filed Oct. 6, 1898.)

(No Model.) 2 Sheets—Sheet 2.

WITNESSES
E. J. Nottingham
G. F. Downing

INVENTOR
J. R. Selzer
By H. G. Seymour
Attorney

THE NORRIS PETERS CO., PHOTO-LITHO., WASHINGTON, D. C.

UNITED STATES PATENT OFFICE.

JOHN R. SELZER, OF MORNING SUN, IOWA.

CARBURETER.

SPECIFICATION forming part of Letters Patent No. 646,320, dated March 27, 1900.

Application filed October 6, 1898. Serial No. 692,830. (No model.)

*To all whom it may concern:*

Be it known that I, JOHN R. SELZER, a resident of Morning Sun, in the county of Louisa and State of Iowa, have invented certain new and useful Improvements in Carbureters; and I do hereby declare the following to be a full, clear, and exact description of the invention, such as will enable others skilled in the art to which it appertains to make and use the same.

My invention relates to an improvement in carbureters, one object of the invention being to so construct an apparatus that when air is forced therein it will be thoroughly carbureted by the gasolene or other hydrocarbon in said apparatus to form carbureted air, which may be used for heating or lighting purposes.

A further object is to provide an apparatus that will effectually carburet air forced therein and by means of which the proportions of air and hydrocarbon can be easily regulated according to the use to which it is to be put.

A further object is to so construct a carbureter that the gasolene or other hydrocarbon will be automatically maintained at a proper level in the carbureter and to provide means in the carbureter to thoroughly mix the air forced therein with the hydrocarbon.

A further object is to provide a carbureter which will be simple in construction, comparatively cheap to manufacture, and most effectual when in use.

With these objects in view the invention consists in certain novel features of construction and combinations and arrangements of parts, as will be more fully hereinafter described, and pointed out in the claims.

Figure 1:
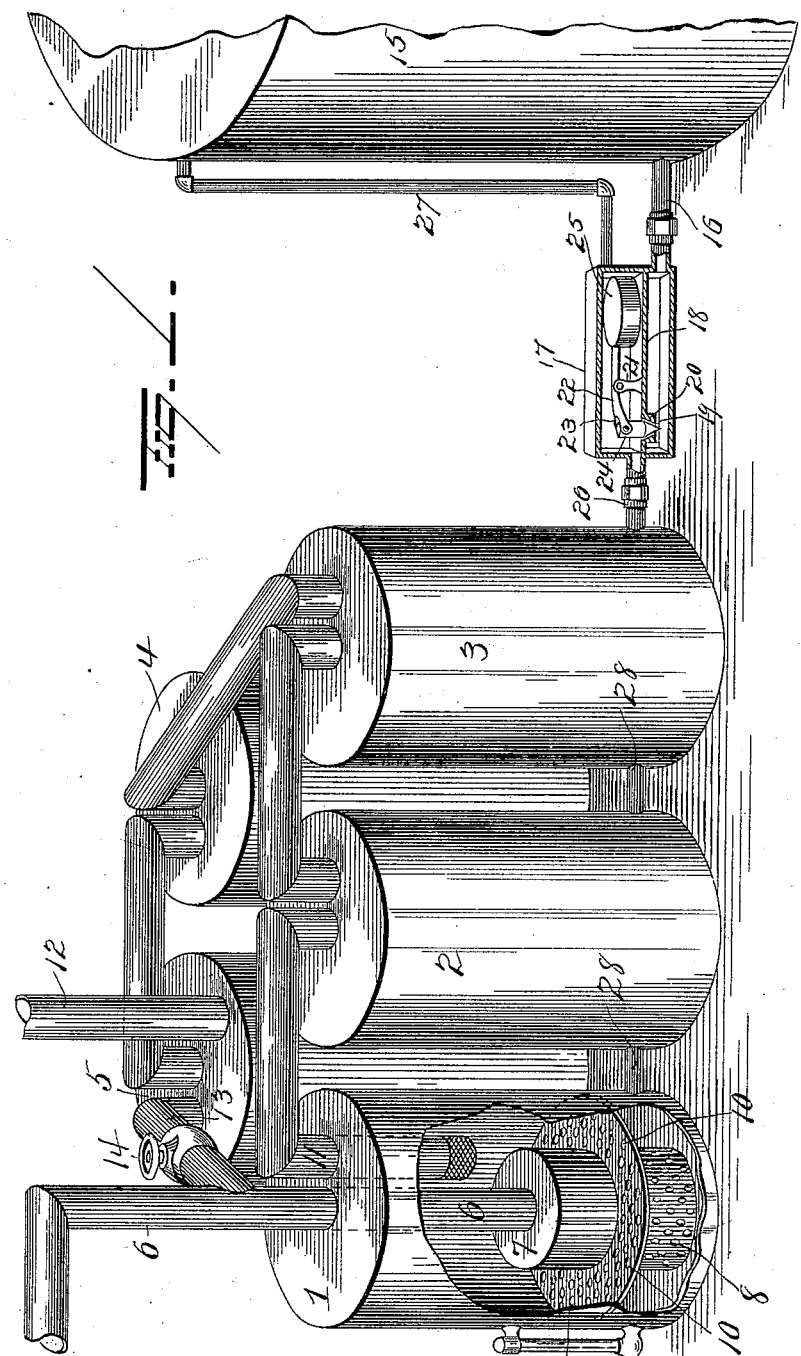
Figure 2:
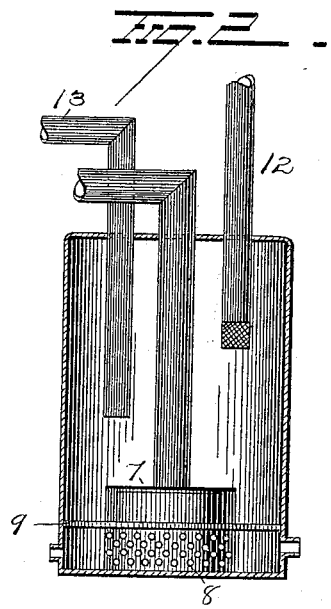
Figure 3:
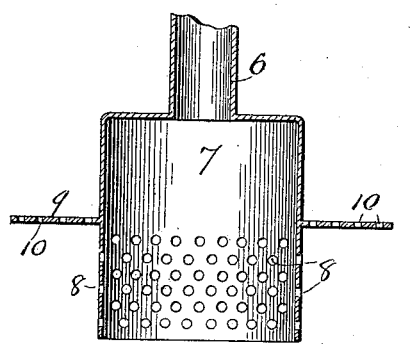
Figure 4:
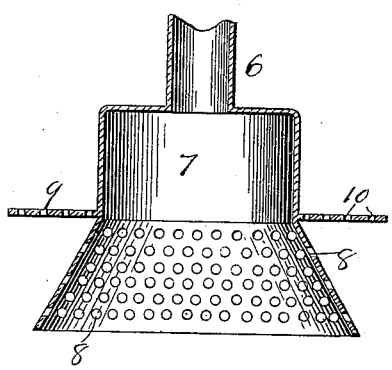

In the accompanying drawings, Figure 1 is a view, partly in section, illustrating my improvements. Fig. 2 is a view in section through the mixing-chamber. Fig. 3 is a detail view of one of my improved distributers; and Fig. 4 is a modified form of distributer.

1, 2, 3, 4, and 5 represent a series of tanks or receptacles, arranged either in a line or group, as shown in Fig. 1. The tanks or receptacles are preferably cylindrical in form and closed at their upper and lower ends. A pipe 6, through which air is forced by any approved means, (not shown,) passes through the top of the tank or receptacle 1 and communicates with the interior of my improved distributer 7, located in the bottom of the tank. The distributer 7 is preferably cylindrical in form, open at its bottom, and provided in its vertical wall, below a point about midway thereof, with perforations 8. A ring 9, corresponding in diameter with that of the interior of the tank or receptacle, is secured around the distributer at a point above the perforations therein and is provided with perforations 10. A pipe 11 communicates with the interior of the receptacle 1 and extends downward therein a short distance and passes upward out of the top of said tank or receptacle 1, thence downward through the top of the tank or receptacle 2 where it communicates with a distributer in said tank 2, similar to the deflector 7 heretofore described. Each tank or receptacle is provided with a distributer and is connected with each succeeding tank in the same manner as above described, and hence it will be unnecessary to describe each receptacle or tank in detail. With tank or receptacle 5, which I term the "mixing-chamber," the pipe 12 communicates for conducting carbureted air to any approved reservoir or point for burning. (Not shown.) A pipe 13, having a valve or cut-off 14 therein, is connected at one end with the air-supply pipe 6 and its other end terminates in the interior of the mixing-chamber 5, whereby to increase the amount of air or oxygen in the carbureted air, if the same is found to be too rich.

An oil-reservoir 15 is disposed in proximity to the tanks or receptacles 1, 2, 3, 4, and 5 and is adapted to supply oil thereto. A pipe 16 communicates at one end with the lower end of the reservoir 15 and communicates at its other end with the lower end of a valve-casing 17. The casing 17 is provided with a horizontal partition 18, disposed above the point where the pipe 16 communicates, and said partition is provided with an opening 19 and a downwardly-projecting conical flange 20 around said opening. An upright or post 21 is secured to said partition, on which post 21 a lever or arm 22 is fulcrumed. One end 23 of said lever is disposed over the opening 19 and is preferably forked for the reception of a plug or valve 24, pivotally attached thereto. The other end of said lever is provided with a float 25, of any approved material. A pipe 26 communicates with said valve-casing 17 above the partition 18 and communicates at its other end with one of the tanks. A vent pipe or tube 27 communicates with the upper portion of the valve-casing and at its other end with the reservoir, as shown. Suitable pipes 28 connect the lower ends of the tanks for supplying oil from the reservoir 15.

The operation of my improved valve is as follows: Oil passes through the pipe 16 to the valve-casing 17 below the partition 18 and passes upward through the opening 19 and out through the pipe 26 to one of the tanks and through pipes 28 to the other tanks. When the oil in the tanks and valve-casing reaches the proper level, the float 25 will be raised to such a height that it will force the plug or valve 23 into the hole 19 and shut off the supply of oil, hence always automatically maintaining the oil-supply at the proper level in the tanks.

The operation of my improved carbureter is as follows: Air is forced through the pipe 6 into the distributer 7 in the tank 1 and passes in jets out through the perforations in the lower portion of the distributer into the gasolene, thence up through the gasolene to the ring 9, which will tend to retard or detain the air in the hydrocarbon to more thoroughly mix with the same. The carbureted air will then pass upward in jets through the perforations in the ring, into the body of the tank, and out through the pipe 11 into the distributer of tank 2, and so on throughout each succeeding tank, thus thoroughly carbureting the air, which finally finds its way to the mixing-chamber 5. If it is desired to use the carbureted air for heating purposes, it is simply necessary to allow it to pass out through the pipe 12, as it is in just the condition for heating purposes; but if it is desired to use the carbureted air for lighting purposes the valve or cut-off 14 in the pipe 13 can be opened and air or oxygen admitted into the mixing-chamber to adapt the carbureted air for lighting purposes.

Instead of making my distributer cylindrical, as above described, I may construct same with conical lower perforated portion, as shown in Fig. 4.

It will be understood that I may employ any number of tanks or receptacles I may desire, according to the use to which the carbureted air is to be put, as it will be readily seen that the greater the number of tanks or receptacles used the more thoroughly the air will be impregnated with the hydrocarbon, and it will also be seen that various slight changes might be resorted to in the general form and arrangement of the several parts described without departing from the spirit and scope of my invention, and hence I would have it understood that I do not wish to limit myself to the precise details set forth, but consider myself at liberty to make such slight changes and alterations as fairly fall within the spirit and scope of my invention.

Having fully described my invention, what I claim as new, and desire to secure by Letters Patent, is—

1. In a carbureter, the combination with a tank, a single hollow body of a diameter appreciably less than that of the tank and located in the bottom thereof, the lower portion of the wall of said hollow body having perforations and the upper part of said hollow body forming a chamber without perforations, a pipe communicating with said chamber, a perforated ring encircling the hollow body above the perforated portion of the wall thereof and extending to the wall of the tank and an outlet-pipe communicating with the tank at a point above said hollow body.

2. In a carbureter, the combination of a tank, a distributer in the bottom of said tank having a perforated lower portion, a perforated ring encircling the distributer above the perforated portion thereof, an air-pipe communicating with the deflector, means for maintaining the level of oil in the tank below said perforated ring and a pipe communicating with the tank in the empty portion thereof above the distributer.

3. In a carbureter, the combination of a tank, a distributer in the bottom of said tank, said distributer having the lower portion of its vertical wall perforated and its upper portion closed and having a chamber in its upper portion, an air-pipe communicating with said chamber, a perforated ring encircling the distributer above the perforated portion thereof, means for confining the level of oil in the tank below the perforated ring, and an outlet-pipe communicating with the empty portion of the tank above the perforated ring.

4. In an apparatus for carbureting air, the combination of a series of tanks, a distributer in the bottom of each tank, each distributer having the lower portion only of its wall perforated, a perforated ring encircling each distributer above the perforated portion thereof, means for confining the level of oil in said tanks to points below said rings, an air-pipe communicating with the distributer in the first tank, pipes projecting into and connecting the empty spaces of the tanks with the distributers of the succeeding tanks from one end of the series to the other, and a valved pipe connecting the air-inlet pipe of the first tank with the last tank of the series.

In testimony whereof I have signed this specification in the presence of two subscribing witnesses.

JOHN R. SELZER.

Witnesses:
O. M. CAVIN,
F. BUSHNELL.